United States Patent
Czajkowski et al.

(10) Patent No.: US 6,834,391 B2
(45) Date of Patent: Dec. 21, 2004

(54) METHOD AND APPARATUS FOR AUTOMATED NATIVE CODE ISOLATION

(75) Inventors: Gregorz J. Czajkowski, Mountain View, CA (US); Laurent P. Daynes, Sunnyvale, CA (US); Mario I. Wolczko, San Carlos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 721 days.

(21) Appl. No.: 09/841,719

(22) Filed: Apr. 24, 2001

(65) Prior Publication Data

US 2002/0065943 A1 May 30, 2002

Related U.S. Application Data

(60) Provisional application No. 60/253,551, filed on Nov. 28, 2000.

(51) Int. Cl.[7] .................................................. G06F 9/46
(52) U.S. Cl. ........................ 719/328; 717/140; 713/167
(58) Field of Search ................................ 719/328–332; 713/167; 717/100–167

(56) References Cited

U.S. PATENT DOCUMENTS 6,442,752 B1 * 8/2002 Jennings et al. ............ 717/162
6,481,006 B1 * 11/2002 Blandy et al. .............. 717/139
6,574,673 B1 * 6/2003 Hari et al. .................. 719/310

* cited by examiner

Primary Examiner—Meng-Al T. An
Assistant Examiner—Charles E. Anya
(74) Attorney, Agent, or Firm—Park, Vaughan & Fleming, LLP

(57) ABSTRACT

One embodiment of the present invention provides a system that facilitates automated isolation of native code within a computer program that has been compiled to a platform-independent code. The system operates by receiving a library containing a native code sub-routine that provides a service to the computer program. The system analyzes the library to determine the symbol name for the native code sub-routine. A proxy sub-routine is generated for each native code sub-routine exported by the native library that forms a link to the native code sub-routine. This proxy sub-routine is placed into a new library using the original name of the native code sub-routine. The system runs the native code sub-routine in one process, and executes the platform-independent code in a separate process. The system invokes the native code sub-routine in the first process by calling the proxy sub-routine from the platform-independent code in the second process.

24 Claims, 4 Drawing Sheets

METHOD AND APPARATUS FOR AUTOMATED NATIVE CODE ISOLATION

RELATED APPLICATION

This application hereby claims priority under 35 U.S.C. §119 to a Provisional Patent Application entitled, "Portable and Automated Native Code Isolation," filed Nov. 28, 2000 by inventors Grzegorz J. Czajkowski, Laurent P. Daynes, and Mario I. Wolczko (Application No. 60/253,551).

BACKGROUND

1. Field of the Invention

The present invention relates to computer instruction codes. More specifically, the present invention relates to a method and an apparatus for automatically isolating native code from platform-independent code written in a safe computer programming language.

2. Related Art

A common trend among computer specialists is to use safe computer-programming languages and systems such as JAVA™ to implement computer programs. (JAVA is a trademark or registered trademark of Sun Microsystems, Inc., Palo Alto, Calif., in the United States and other countries.) Typically, programs written in these safe computer-programming languages are compiled to a platform-independent code for execution within a safe virtual machine on a variety of target computers. In this context, the term "safe" indicates a level of confidence that the program and runtime system will not interfere with other applications running on the target computer and will not adversely affect memory use.

The growing popularity of these safe computer-programming languages has not, however, obviated the need for using native code on the target computers. Native code is code that has been compiled into the native instruction set of a particular computer processor. While safe languages offer many benefits, including inherent code reliability, increased programmer productivity, and ease of code maintenance, it is quite often desirable to execute user-supplied native code. There are several reasons for accepting this impurity, such as higher performance, access to devices and programming interfaces for which there is no standard mapping from the platform-independent runtime system, and direct interaction with operating system services. Nevertheless, native code is unsafe and, as such, breaks the contract offered by the safe language.

As an example of how native code is accessed by safe code running in a safe environment, FIG. 1 illustrates platform-independent runtime environment 104 accessing native code library 106. Platform-independent runtime environment 104 is contained within process 102 and is typically executing a platform-independent program. Process 102 also includes native code library 106 and platform-independent native interface (PINI) 108. Platform-independent runtime environment 104 and any executing platform-independent programs access native code library 106 through PINI 108. The interaction through PINI 108 can have two forms: downcall 110 (when a platform-independent program calls a native sub-routine) and upcall 112 (when a native sub-routine needs to access data or invoke sub-routines of the platform-independent program). PINI 108 is the only access point to native code library 106 from platform-independent runtime environment 104. In operation, a platform-independent program running in platform-independent runtime environment 104 can make downcall 110 to a sub-routine within native code library 106. In turn, native code library 106 can make an upcall to platform-independent runtime environment 104 to access data and platform-independent sub-routines.

Making native code not violate certain safety policies while it is executing in the same address space as the platform-independent code has been the focus of several research projects. Descriptions of relevant research projects can be found in the following references: *Efficient software fault isolation* (Wahbe, R., Lucco, S., Anderson, T., and Graham, S., 14th ACM Symposium on Operating Systems Principles, Asheville, N.C. December 1993) describes augmenting native code with safety-enforcing software checks. *Safe Kernel Extensions without Runtime Checking* (Necula, G, and Lee, P., Proceedings of the Second Symposium on Operating Systems Design and Implementation, Seattle, Wash., 1996) describes statically analyzing native code and proving it to be memory safe. *TALx86: A Realistic Typed Assembly Language* (Morrisett, G., Crary, K., Glew, N., Grossman, D., Samuels, R., Smith, F., Walker, D., Weirich, S., and Zdancewic, S., Proceedings of ACM SIGPLAN Workshop on Compiler Support for System Software, Atlanta, Ga., May 1999) describes designing a low-level, statically typed target language for compiling native code.

While the methods used in these research projects have been successful to a point and are useful in some circumstances, their usefulness for addressing problems with an arbitrary native library is rather limited. Augmenting the native code with safety-enforcing software checks can incur a substantial performance penalty, which is difficult to accept when considered in conjunction with the fact that the native code is often used as a performance-boosting mechanism. Statically analyzing the native code and proving that it is safe requires the availability of the source code for the native code and the generation of formal proofs of correctness, which is difficult or impossible.

Most platform-independent systems contain a mix of native code, native code compiled from bytecode, native code that is part of the platform-independent virtual machine (PIVM) runtime and interpreter, native code that is part of the core libraries, and, optionally, user-specified native code. While most of this native code is logically part of the PIVM runtime, is designed, implemented, and tested by the developers of the particular implementation of the PIVM, and is totally under their control, user-specified native code has not been subjected to the same rigor and, therefore, is subject to a multitude of problems.

Native code is usually thought of as being written against two interfaces: the PINI, which is its sole interaction with the PIVM and platform-independent application, and the host operating system interfaces involving the usual libraries for input/output (I/O), threading, math, networking, and the like. The host operating system interface is also the interface against which the PIVM is written, and therein lies a problem. The PIVM has to make certain decisions regarding the use of the host operating system interface and of available resources. For example:

Signal handlers may need to be instantiated to handle exceptions that are part of the operation of the PIVM (e.g., to detect null pointer and other memory exceptions, to detect arithmetic exceptions, to detect an interrupt signal, etc.).

The PIVM must choose a memory management regime (involving such things as malloc/free and mmap/munmap) for its own purposes, including the allocation of thread stacks and red zones.

Platform-independent threads are typically mapped onto the underlying system's threading mechanism and a convention is adopted to suspend and resume threads for garbage collection (GC), to assign threads to GC and compilation tasks, etc.

The PIVM must decide how to manage I/O (e.g., the use of blocking or non-blocking calls).

The core classes automatically take care of freeing some system resources (e.g., closing open file descriptors); this policy does not extend to the very same resources used exclusively by native code.

Few, if any, of these mechanisms are composable, in the sense that it is not possible to take two arbitrary native programs, which use the PINI and the host operating system interface, put them together into one process, and expect the resulting system to work correctly. So, in reality, the user specific native code has to be written to a set of implicit interfaces that do not conflict with the way the PIVM uses system resources. These implicit conventions are rarely documented (because they are highly dependent on the implementation decisions within the PIVM, which are subject to frequent change, and are usually thought of as private to the PIVM), and do not have to be common across even the same vendor's PIVMs on the same platform, much less PIVMs on differing platforms and certainly not across different vendor's PIVMs. Furthermore, it is rare that legacy libraries will respect these conventions: the economics of amending these libraries to respect these conventions are prohibitive (e.g., source code to the libraries may not be available to either the vendor of a particular implementation of the PIVM or to the customer using the library). Hence, it may be impossible to use certain libraries from platform-independent applications, or the usability may change with new releases of the PIVM.

These problems are exacerbated by so-called "PIVM embedding" as discussed in *A Case for Embedding the JVM into Apps*. (Morganthal, J., Internetweek, Jun. 22, 1998, Issue 720) in which the PIVM is treated as a library that can be linked into other applications. In this scenario, it cannot even be mandated that the PIVM be in some way "in charge", because it may be subservient to another application. The issue here is that the PIVM becomes both the provider of functionality (as an embedded service) and the client of functionality (when calling native code) and is expected to control native code loaded by itself and at the same time not to interfere with the way the embedding application uses system resources, system interface, etc.

The very same problems are bound to plague emerging multitasking PIVMs. While the proposed approaches and techniques enabling multitasking in the PIVM vary, one theme is common to all of these efforts: the assumption that no user-supplied native code is run by any of the tasks. This is so because any undesirable operation caused by user-supplied native code (e.g., corrupting memory of other tasks or of the runtime, calling exit( ), or changing signal handlers previously set up by the runtime) can cause a crash of or otherwise jeopardize not only its own task but the whole PIVM, including all the other tasks. Unless a comprehensive approach is found to contain various aspects of the damage runaway native code can cause, native code may have to be banned from safe-language multitasking systems.

It goes without saying that the resultant reliability of systems based on this combination is less than desired. The composition of complex applications based on a PIVM and native libraries is therefore something of a hit or miss nature.

The PIVM needs some system resources (file descriptors, memory, etc.) to perform its essential functions. It can manage these resources when they are required only in support of platform-independent code, because the PIVM, in its role effectively as an ersatz operating system (OS), mediates between the platform-independent application and the underlying resource provider, namely the underlying OS. However, when arbitrary native code coexists with the PIVM, it cannot expect to always find resources available. For example, native code could use up the remaining file descriptors causing failure in the PIVM when it needs to access a file. This happens not only when a platform-independent application opens a file, but also in support of internal operations, such a error logging, class loading, managing memory, etc.

While it is possible to implement the PIVM to cope with resource starvation at arbitrary moments, this level of defensiveness requires the PIVM to pre-allocate all it needs for its essential operations, artificially inflating the application's usage of system resources. It is also extremely difficult to write and test the PIVM code that must deal with resource starvation.

When there is a problem in the interaction between the native code and the PIVM, debugging can be a nightmare. Simple bugs in native code can cause PIVM data structures to be corrupted leading to random failures long after the problem has occurred. If these bugs have pathologies which are time varying, the bug can manifest itself in arbitrary places within the PIVM.

For the purposes of fault isolation, it would be desirable if native code bugs were clearly identifiable as such: this would at least save considerable effort. Using techniques enforcing safety at the level of binaries can lead to a clear verdict on whether a particular memory safety violation is caused by a user-supplied native library or by some other part of the runtime. Bugs resulting from conflicting use of system resources are much harder to find. Moreover, the road from detection to finding an actual cause can be a long one, especially when no (or no good) tools for mixed-mode debugging exist for a given hardware/OS/PIVM implementation platform.

What is needed is a method and an apparatus that allows a safe program to use sub-routines in a native code library without incurring the problems mentioned above.

SUMMARY

One embodiment of the present invention provides a system that facilitates automated isolation of native code within a computer program that has been compiled to a platform-independent code. The system operates by receiving a library containing a native code sub-routine that provides a service to the computer program. The system analyzes the library to determine the symbol name for the native code sub-routine. A proxy sub-routine is generated for each native code sub-routine exported by the native library that forms a link to the native code sub-routine. This proxy sub-routine is placed into a new library using the original name of the native code sub-routine. The system runs the native code sub-routine in one process, and executes the platform-independent code in a separate process. The system invokes the native code sub-routine in the first process by calling the proxy sub-routine from the platform-independent code in the second process.

In one embodiment of the present invention, the system provides a proxy platform-independent native interface (PINI) to the library containing the native code sub-routine. The system transparently transforms local PINI calls into calls to the proxy PINI. Transforming local PINI calls into calls to the proxy PINI preserves the original control flow such that a PINI upcall will be executed by the same thread that called the native sub-routine, and, conversely, subsequent downcalls to the native method will be guaranteed to be executed by the same thread of the process that is executing the native method.

In one embodiment of the present invention, analyzing the library to determine the defined symbol name includes analyzing the library to determine call arguments for the defined symbol name.

In one embodiment of the present invention, analyzing the library to determine call arguments for the defined symbol name is accomplished at runtime by analyzing the current call frame.

In one embodiment of the present invention, the system copies call arguments from the proxy sub-routine to a call to the native code sub-routine.

In one embodiment of the present invention, the system returns a result value from the native code sub-routine to the proxy sub-routine.

In one embodiment of the present invention, operations in the first process are isolated from memory and other system resources belonging to the second process so that an error in the first process does not corrupt memory belong to the second process.

In one embodiment of the present invention, the proxy sub-routine and the native code sub-routine communicate through inter-process communication.

In one embodiment of the present invention, forming the link to the native code sub-routine includes translating a data element from a first address width in the computer program to a second address width in the native code subroutine.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Native Code in a Separate Process

Figure 2:
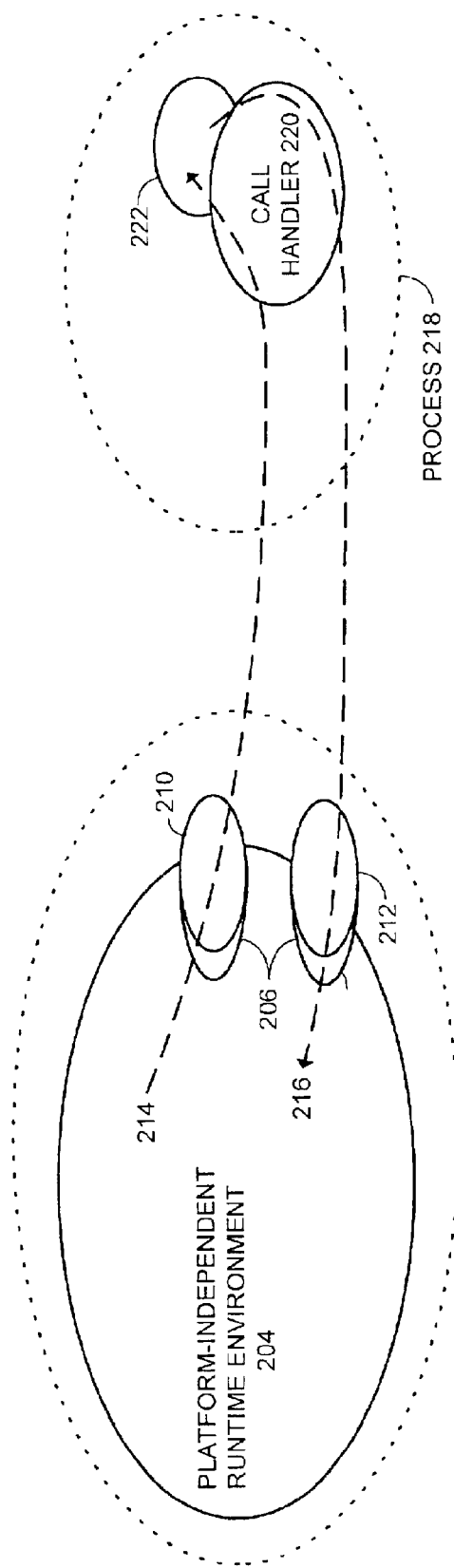
FIG. 2 illustrates interactions between platform-independent runtime environment 204 and native code library 222 in accordance with an embodiment of the present invention.

FIG. 2 illustrates platform-independent runtime environment 204 accessing native code library 222 in accordance with an embodiment of the present invention. Platform-independent runtime environment 204 is running within process 202, while native code library 222 is running within process 218. Process 202 and process 218 are isolated from each other by the computer operating system (not shown) and are each prevented from accessing memory in the other process. Platform-independent runtime environment 204 may be executing a platform-independent program.

If platform-independent runtime environment 204 requires a service from a sub-routine in native code library 222, platform-independent runtime environment 204 generates downcall 214 and passes downcall identifier and its arguments 214 to platform-independent native code interface (PINI) 206. Note that PINI 206 is not changed from the prior art. PINI 206 passes downcall 214 to proxies 210. Proxies 210 have the same sub-routine names and parameter lists as the sub-routines within native code library 222. Proxies 210 sends the call arguments from downcall 214 plus a unique integer identifying the required subroutine to call handler 220 in process 218. The communication between process 202 and process 218 can be any suitable interprocess call (IPC). IPC methods are well known in the art and will not be discussed further.

Call handler 220 receives the call arguments from downcall 214 plus the unique integer identifying the required sub-routine. Call handler 220 creates the proper sub-routine call to native code library 222. Return values such as status messages and calculation results from the sub-routine within native code library 222 are passed back to platform-independent runtime environment 204 using the IPC.

If the sub-routine within native code library 222 requires upcall 216 to a sub-routine or data in platform-independent runtime environment 204, upcall 216 and its arguments are passed to call handler 220. Call handler 220 sends the call arguments from upcall 216 plus a unique integer identifying the required subroutine or data to upcall handler 212 in process 202. As with downcall 214, the communication between process 218 and process 202 for upcall 216 can be any suitable IPC. Upcall handler 212 receives the call arguments from upcall 216 plus the unique integer identifying the required sub-routine or data. Upcall handler 212 passes the upcall to platform-independent runtime environment 204 through PINI 206. Return values and data for upcall 216 are passed back to native code library 222 through the IPC mechanism. The system guarantees that upcall 216 will be executed by the same thread of the process that made downcall 214 to the native method.

Multiple Libraries

Figure 1:
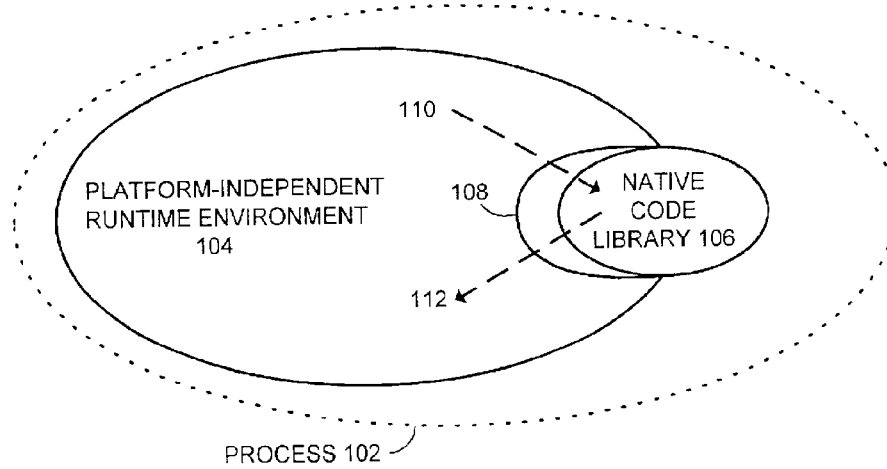
FIG. 1 illustrates interactions between platform-independent runtime environment 104 and native code library 106.
Figure 3A:
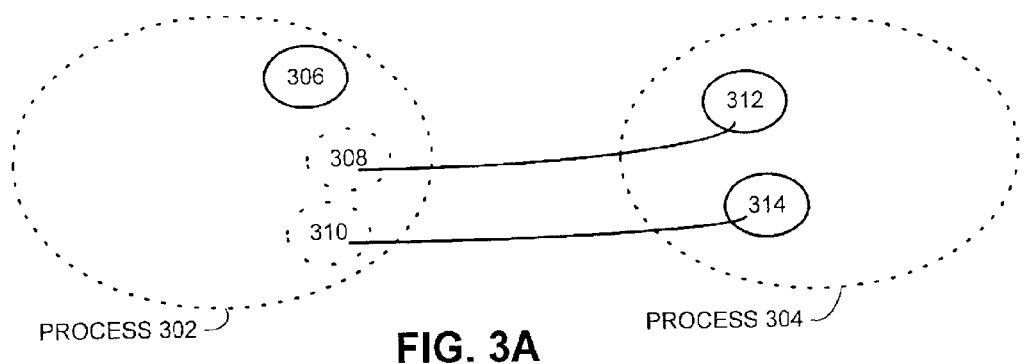
FIG. 3A illustrates multiple native code libraries placed in a separate process in accordance with an embodiment of the present invention.

FIG. 3A illustrates multiple native code libraries placed in a separate process in accordance with an embodiment of the present invention. In this embodiment, platform-independent code running within process 302 requires the services supplied by native code libraries 306, 312, and 314. Native code library 306 can be a trusted library and has been retained within process 302. Native code libraries 312 and 314 have been placed in process 304 and are accessed by proxies 308 and 310 respectively. Details of the interfaces to native code libraries 312 and 314 are as described above and will not be discussed further.

Figure 3B:
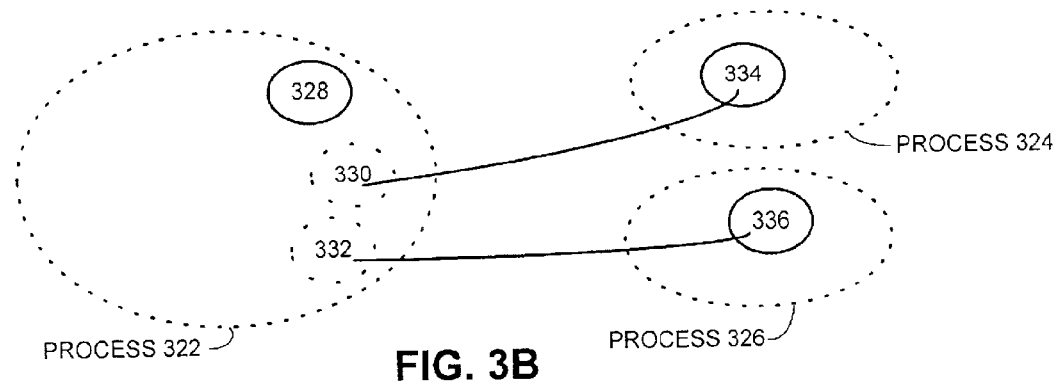
FIG. 3B illustrates multiple native code libraries placed in multiple separate processes in accordance with an embodiment of the present invention.

FIG. 3B illustrates multiple native code libraries placed in multiple separate processes in accordance with an embodiment of the present invention. In this embodiment, platform-independent code running within process 322 requires the services supplied by native code libraries 328, 334, and 336. Native code library 328 can be a trusted library and has been retained within process 322. Native code libraries 334 and 336 have been placed in processes 324 and 326 respectively and are accessed by proxies 330 and 332 respectively. Details of the interfaces to native code libraries 334 and 336 are as described above and will not be discussed further.

Computer System

Figure 4:
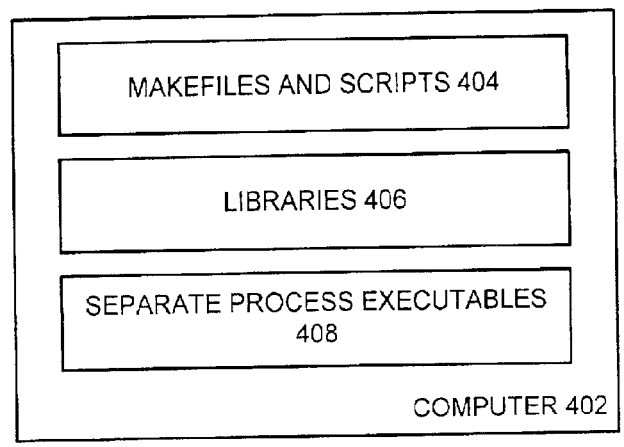
FIG. 4 illustrates computer 402 in accordance with an embodiment of the present invention.

FIG. 4 illustrates computer 402 in accordance with an embodiment of the present invention. Computer 402 can generally include any type of computer system, including, but not limited to, a computer system based on a microprocessor, a mainframe computer, a digital signal processor, a portable computing device, a personal organizer, a device controller, and a computational engine within an appliance. Computer 402 includes makefiles and scripts 404, libraries 406, and separate process executables 408.

Makefiles and scripts 404 include the necessary files to automatically create a proxy library from a native code library and to generate the necessary code so that a platform-independent runtime environment can use the proxy library to access the native code library transparently. Libraries 406 includes native code libraries that have not been converted to proxy libraries and any previously converted proxy libraries. Separate process executables 408 includes the native code libraries that have been replaced by proxy libraries and the necessary code to run these native code libraries in a separate process so that the proxy library sub-routines can access the native code library sub-routines.

Creating the Proxies

Figure 5:
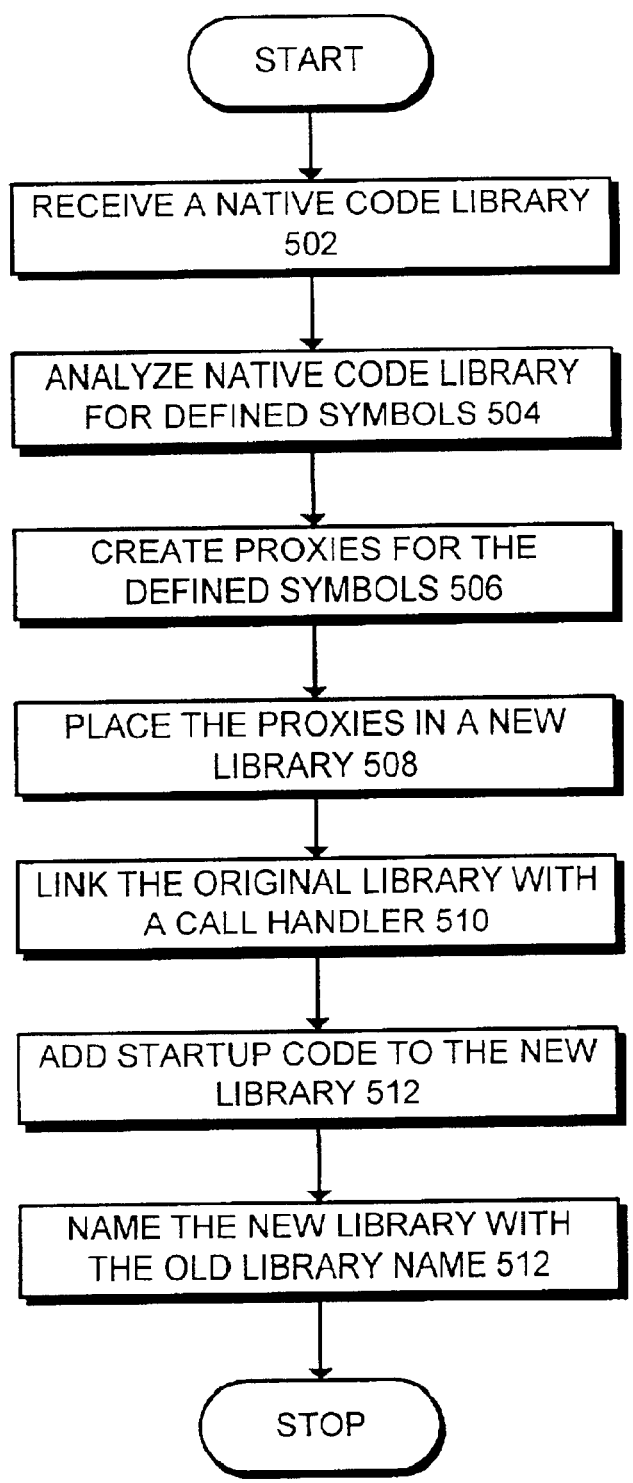
FIG. 5 is a flowchart illustrating the process of creating a proxy library to interface with a native code library in accordance with an embodiment of the present invention.

FIG. 5 is a flowchart illustrating the process of creating a proxy library to interface with a native code library in accordance with an embodiment of the present invention. The system starts when makefiles and scripts 404 receives a native code library (step 502). Makefiles and scripts 404 analyzes the native code library to determine the symbols and, on some systems, parameter lists included in the native code library (step 504). Next, makefiles and scripts 404 creates proxy sub-routines for each symbol in the native code library (step 506).

In creating a proxy sub-routine, makefiles and scripts 404 creates a sub-routine with the same name as the native code sub-routine and includes the parameter lists for the native code sub-routine. The proxy sub-routine uses interprocess communication (IPC) to transfer the parameters and a unique identifier, which identifies the native code sub-routine to the code handler for the native code library running in a separate process. Note that the proxy sub-routine can also be configured to change the address size of a data element. This is useful for interfacing a library that uses a different address width than the platform-independent code was designed to use. For example, a thirty-two bit program could use a new sixty-four bit native code library.

Makefiles and scripts 404 then places the proxy sub-routines in a new library (step 508). Next, makefiles and scripts 404 links the original native code library to the call handler (step 510). The call handler interfaces the native code library to the IPC calls generated in 506. Makefiles and scripts 404 also places startup code in the new library, which will start the native code library and call handler in a separate process and perform any initialization required to allow IPC calls (step 512). Finally, makefiles and scripts 404 renames the new library using the name of the native code library (step 512). Also, a change to paths listing directories with dynamically loadable libraries may be performed by scripts.

Using the Proxies

Figure 6:
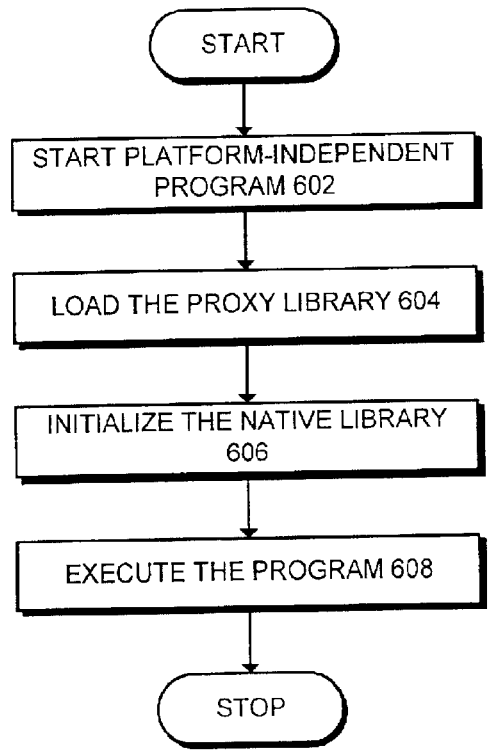
FIG. 6 is a flowchart illustrating the process of using a proxy library in accordance with an embodiment of the present invention.

FIG. 6 is a flowchart illustrating the process of using a proxy library in accordance with an embodiment of the present invention. The system starts when a platform-independent runtime environment, say platform-independent runtime environment 204 starts a platform-independent program (step 602). Platform-independent runtime environment 204 loads the proxy library instead of the native code library (step 604). Note that this is a transparent operation because the proxy library has the name of the native code library, which it replaced.

Initialization code within the proxy library starts the native code library and call handler in a separate process (step 606). After initialization, platform-independent runtime environment 204 executes the platform-independent program using the proxy library to interface with the native code library as described above in conjunction with FIG. 2 (step 608).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computerized method to automate isolation of native code within a computer program that has been compiled to a platform-independent code, the method comprising:

receiving a library containing a native code sub-routine from a first process, wherein the native code sub-routine provides a service to the computer program;

analyzing the library in a second process to determine a defined symbol name for the native code sub-routine;

creating a proxy sub-routine for the native code sub-routine, wherein the proxy sub-routine forms a link to the native code sub-routine;

placing the proxy sub-routine into a memory of a new library in the second process using the defined symbol name of the native code sub-routine as a symbol name for the proxy sub-routine;

running the native code sub-routine in the first process;

executing the platform-independent code in the second process; and invoking the native code sub-routine in the first process by using an interprocess call from in the first process to call the proxy sub-routine in the platform-independent code in the second process;

wherein operations in the first process are isolated from memory and other system resources belonging to the second process by ensuring that interactions between the first process and the second process take place through the interprocess call, so that an error in the first process does not, one of, corrupt memory belonging to the second process or interfere with the second process in any other way.

2. The method of claim 1, further comprising:
providing a proxy platform-independent native interface (PINI) to the library containing the native code sub-routine; and
transparently transforming local PINI calls into calls to the proxy PINI,
wherein transforming local PINI calls into calls to the proxy PINI preserves an original control flow, and
wherein upcalls and downcalls are guaranteed to be executed by a same thread of a process that executes the native code sub-routine.

3. The method of claim 1, wherein analyzing the library to determine the defined symbol name includes analyzing the library to determine call arguments for the defined symbol name.

4. The method of claim 3, wherein analyzing the library to determine call arguments for the defined symbol name is accomplished at runtime by analyzing a current call frame.

5. The method of claim 3, further comprising copying call arguments from the proxy sub-routine to a call to the native code sub-routine.

6. The method of claim 3, further comprising returning a result value from the native code sub-routine to the proxy sub-routine.

7. The method of claim 1, wherein the proxy sub-routine and the native code sub-routine communicate through inter-process communication.

8. The method of claim 1, wherein forming the link to the native code sub-routine includes translating a data element from a first address width in the computer program to a second address width in the native code sub-routine.

9. A computer-readable storage medium storing instructions that when executed by a computer cause the computer to perform a method to facilitate automated isolation of native code within a computer program that has been compiled to a platform-independent code, the method comprising:
receiving a library containing a native code sub-routine from a first process, wherein the native code sub-routine provides a service to the computer program;
analyzing the library in a second process to determine a defined symbol name for the native code sub-routine;
creating a proxy sub-routine for the native code sub-routine, wherein the proxy sub-routine forms a link to the native code sub-routine;
placing the proxy sub-routine into a memory of a new library in the second process using the defined symbol name of the native code sub-routine as a symbol name for the proxy sub-routine;
running the native code sub-routine in the first process;
executing the platform-independent code in the second process; and
invoking the native code sub-routine in the first process by using an interprocess call from the first process to call the proxy sub-routine in the platform-independent code in the second process;
wherein operations in the first process are isolated from memory and other system resources belonging to the second process by ensuring that interactions between the first process and the second process take place through the interprocess call, so that an error in the first process does not, one of, corrupt memory belonging to the second process or interfere with the second process in any other way.

10. The computer-readable storage medium of claim 9, the method further comprising:
providing a proxy platform-independent native interface (PINI) to the library containing the native code sub-routine; and
transparently transforming local PINI calls into calls to the proxy PINI,
wherein transforming local PINI calls into calls to the proxy PINI preserves an original control flow, and
wherein upcalls and downcalls are guaranteed to be executed by a same thread of a process that executes the native code sub-routine.

11. The computer-readable storage medium of claim 9, wherein analyzing the library to determine the defined symbol name includes analyzing the library to determine call arguments for the defined symbol name.

12. The computer-readable storage medium of claim 11, wherein analyzing the library to determine call arguments for the defined symbol name is accomplished at runtime by analyzing a current call frame.

13. The computer-readable storage medium of claim 11, the method further comprising copying call arguments from the proxy sub-routine to a call to the native code sub-routine.

14. The computer-readable storage medium of claim 11, the method further comprising returning a result value from the native code sub-routine to the proxy sub-routine.

15. The computer-readable storage medium of claim 9, wherein the proxy sub-routine and the native code sub-routine communicate through inter-process communication.

16. The computer-readable storage medium of claim 9, wherein forming the link to the native code sub-routine includes translating a data element from a first address width in the computer program to a second address width in the native code sub-routine.

17. An apparatus that facilitates automated isolation of native code within a computer program that has been compiled to a platform-independent code, the apparatus comprising:
a receiving mechanism that is configured to receive a library containing a native code sub-routine from a first process, wherein the native code sub-routine provides a service to the computer program;
an analyzing mechanism in a second process that is configured to analyze the library to determine a defined symbol name for the native code sub-routine;
a creating mechanism that is configured to create a proxy sub-routine for the native code sub-routine, wherein the proxy sub-routine forms a link to the native code sub-routine;
a placing mechanism that is configured to place the proxy sub-routine into a memory of a new library in the second process using the defined symbol name of the native code sub-routine as a symbol name for the proxy sub-routine;
a running mechanism that is configured to run the native code sub-routine in the first process;
an executing mechanism that is configured to execute the platform-independent code in the second process; and
an invoking mechanism that is configured to invoke the native code sub-routine in the, first process by using an interprocess call from the first process to call the proxy sub-routine in the platform-independent code in the second process;

wherein operations in the first process are isolated from memory and other system resources belonging to the second process by ensuring that interactions between the first process and the second process take place through the interprocess call, so that an error in the first process does not, one of, corrupt memory belonging to the second process or interfere with the second process in any other way.

18. The apparatus of claim 17, further comprising:

a providing mechanism configured to provide a proxy platform-independent native interface (PINI) to the library containing the native code sub-routine; and a transforming mechanism that is configured to transparently transform local PINI calls into calls to the proxy PINI, wherein transforming local PINI calls into calls to the proxy PINI preserves an original control flow, and wherein upcalls and downcalls are guaranteed to be executed by a same thread of a process that executes the native code sub-routine.

19. The apparatus of claim 17, wherein the analyzing mechanism is further configured to analyze the library to determine call arguments for the defined symbol name.

20. The apparatus of claim 19, wherein analyzing the library to determine call arguments for the defined symbol name is accomplished at runtime by analyzing a current call frame.

21. The apparatus of claim 19, further comprising a copying mechanism that is configured to copy call arguments from the proxy sub-routine to a call to the native code sub-routine.

22. The apparatus of claim 19, further comprising a returning mechanism that is configured to return a result value from the native code sub-routine to the proxy sub-routine.

23. The apparatus of claim 17, further comprising an inter-process communication mechanism that is configured so that the proxy sub-routine and the native code sub-routine can communicate.

24. The apparatus of claim 17, further comprising an address width translating mechanism that is configured to translate an address from a first address width in the computer program to a second address width in the native code sub-routine.

* * * * *